US007014668B2

(12) United States Patent
Golubkov et al.

(10) Patent No.: US 7,014,668 B2
(45) Date of Patent: Mar. 21, 2006

(54) MOTOR FUEL FOR DIESEL, GAS-TURBINE AND TURBOJET ENGINES

(75) Inventors: Angelica Golubkov, Lidingö (SE); Igor Golubkov, Lidingö (SE)

(73) Assignee: Agrofuel AB, Stockholm (SE)

( * ) Notice: Subject to any disclaimer, the term of this patent is extended or adjusted under 35 U.S.C. 154(b) by 172 days.

(21) Appl. No.: 09/848,293

(22) Filed: May 4, 2001

(65) Prior Publication Data

US 2002/0026744 A1 Mar. 7, 2002

Related U.S. Application Data

(63) Continuation of application No. PCT/SE00/01717, filed on Sep. 6, 2000, and a continuation of application No. PCT/SE99/01546, filed on Sep. 6, 1999.

(51) Int. Cl.
*C10L 1/18* (2006.01)

(52) U.S. Cl. .............. 44/438; 44/446; 44/447; 44/451; 44/452

(58) Field of Classification Search ............ 44/438, 44/446, 447, 451, 452
See application file for complete search history.

(56) References Cited

U.S. PATENT DOCUMENTS

| | | | | |
|---|---|---|---|---|
| 3,732,283 | A | * 5/1973 | Cummings | 558/482 |
| 4,328,005 | A | * 5/1982 | Frankel et al. | 44/384 |
| 4,336,032 | A | 6/1982 | Kupka et al. | 44/452 |
| 4,356,001 | A | * 10/1982 | Sweeney et al. | 44/446 |
| 4,451,265 | A | 5/1984 | Schwab | 44/302 |
| 4,509,950 | A | 4/1985 | Baker | 44/302 |
| 4,522,630 | A | * 6/1985 | Seemuth | 44/324 |
| 4,536,190 | A | * 8/1985 | Seemuth | 44/324 |
| 4,549,883 | A | * 10/1985 | Purcell et al. | 44/324 |
| 4,746,420 | A | * 5/1988 | Darian et al. | 208/222 |
| 4,892,562 | A | * 1/1990 | Bowers et al. | 44/324 |
| 5,314,511 | A | 5/1994 | Liotta, Jr. et al. | 44/322 |
| 5,405,417 | A | * 4/1995 | Cunningham | 44/322 |
| 5,697,987 | A | * 12/1997 | Paul | 44/352 |
| 5,766,272 | A | * 6/1998 | Lozzi | 44/324 |
| 6,129,773 | A | * 10/2000 | Killick et al. | 44/388 |

FOREIGN PATENT DOCUMENTS

| | | | |
|---|---|---|---|
| EP | 0 014 992 | | 9/1980 |
| EP | 121089 | A * | 10/1984 |
| EP | 121089 | B1 * | 5/1989 |
| EP | 0 319 060 | | 6/1989 |
| EP | 0 475 620 | | 3/1992 |
| EP | 0 681 023 | A1 | 11/1995 |
| FR | 2453210 | | 10/1980 |
| FR | 2 498 622 | | 7/1982 |
| GB | 2 090 611 | | 7/1982 |
| GB | 2 090 612 | | 7/1982 |
| GB | 2 090 613 | | 7/1982 |
| GB | 2115002 | | 9/1983 |
| JP | 7-118670 | | 5/1995 |
| WO | WO 95/02654 | | 1/1995 |

OTHER PUBLICATIONS

Mujunke et al, EP 121089 English Abstrat, pp. 1–2, Oct.–1984.*
Technical Feasibility of Diesohol, *ASAE Paper*, pp. 79–1052 (1979).
Johnson R.T., Stoffer J.O., *Soc. Automot. Eng.* (Spec. Publ.) S.P. 542, 91–104 (1983).
Mathur H.B., Babu M.K., *Indian Inst. Techn. Journ. Therm. Eng.*: 2(3), p. 63–72 (1988).
Haschimoto, K., et al., *Journal. Jap. Petrol. Inst.*: 39(2), p. 166–169 (1996).
Encyclopedia of Chemical Technology, $4^{th}$ ed., vol. 12, pp. 378–381 (1994).

* cited by examiner

*Primary Examiner*—Cephia D. Toomer
(74) *Attorney, Agent, or Firm*—Fitzpatrick, Cella, Harper & Scinto

(57) ABSTRACT

The invention relates to a motor fuel suitable for diesel, gas-turbine and jet engines and standard engines, comprising a mixture of organic compounds having oxygen-containing functional groups, and optionally a hydrocarbon fraction. The fuel is typically a stable homogeneous liquid at atmospheric pressure and normal ambient temperature and achieves a reduction of harmful pollutants in the exhaust emissions of the engines. A total of at least four different oxygen-containing functional groups are present in at least two different oxygen-containing organic compounds. The total concentration of organic compounds containing bound oxygen in the fuel composition generally varies from 5% and to 100% of the total volume of the fuel composition, and the concentration of the hydrocarbon compounds varies, correspondingly, from 95% to 0% of the total volume of the fuel composition.

31 Claims, No Drawings

MOTOR FUEL FOR DIESEL, GAS-TURBINE AND TURBOJET ENGINES

This application is a continuation of International Application Nos. PCT/SE99/01546, filed on Sep. 6, 1999, and PCT/SE00/01717, filed on Sep. 6, 2000.

BACKGROUND OF THE INVENTION

1. Field of the Invention

The present invention relates to motor fuel suitable, for example, in diesel, gas-turbine, and turbojet engines, and especially in standard engines. This motor fuel includes fuel compositions of organic compounds containing bound oxygen, and, optionally, hydrocarbon compounds. In addition, this invention relates to fuel compositions that are stable, homogeneous liquids under normal operating conditions of the engines mentioned above.

2. Background to the Invention

Reduction of pollutants in exhaust emissions of diesel engines represents a challenge to modern society. It has been proposed to replace diesel oil, for example, EN 590 and No. 2 diesel oil, and the like, as a fuel for vehicles, because of environmental reasons and also due to its effects on health. There are international agreements providing for the progressive tightening of the requirements concerning the amount of toxic products resulting from combustion of motor fuel in the exhaust emissions of vehicles and other machines using diesel engines. In the European Union countries and in the United States, the requirements of Step II come into effect in the year 2002. Such requirements mandate a significant decrease in carbon monoxide (CO), mixtures of hydrocarbons and nitrogen oxides (HC+$NO_x$), and particles in the exhaust emissions of diesel engines.

Moreover, modern society is preoccupied with the ameliorating the global imbalance of carbon dioxide in the atmosphere, which is linked to the intensive burning of petroleum products, coal and fossil gas. The damage to the carbon dioxide balance in the atmosphere causes global climate warming and has a negative influence on our planet.

In this regard, the development of motor fuel for engines obtained from renewable plant resources is of real significance.

The growing concern for the protection of the environment and stricter standards in the content of harmful components in exhaust emissions forces the industry to develop urgently various alternative fuels that burn more cleanly than the ones that are in use today.

The existing global inventory of vehicles and machinery with standard diesel, gas-turbine and turbojet engines does not currently the complete elimination of hydrocarbon mixtures obtained from mineral resources, for example crude oil, coal and natural gas, as motor fuel. Diesel oil is such a hydrocarbon mixture.

On the other hand, it is possible to replace a portion of hydrocarbons in motor fuel, such as diesel oil, with other organic compounds that provide cleaner exhaust emissions and do not adversely affect engine performance. Gasolines comprising oxygen-containing compounds are widely used. It is also known, for instance, that replacing 15% of the diesel oil by alcohol in motor fuel results in cleaner exhaust and provides acceptable power without modification of existing diesel engines.

However, the problem of using the most widely available and inexpensive alcohols, methanol and ethanol, as a portion of a motor fuel is that these compounds are immiscible with diesel and gas oil fuels. Potentially, alcohols and other oxygen containing compounds should yield environmentally clean products of combustion. However, the combustion process in engines is an extremely complicated phenomenon, which is affected not only by the composition of the fuel, but also by the physical parameters of the fuel, and, initially by the homogeneity of the liquid.

The feasibility and properties of mixtures of petroleum diesel fraction with ethanol was reported in Technical Feasibility of Diesohol, ASAE Paper 79-1052 in 1979. It was stressed in that article that the main problem related to using such a fuel is its tendency for phase separation. Furthermore, the phase separation is significantly affected by the presence of water in the system. At 0° C., a water content of only 0.05% causes separation of a motor fuel consisting of 99% diesel and 0.95% ethanol.

It is widely known that $NO_x$ emissions can be reduced by reducing the combustion temperature. One way to achieve this reduced combustion temperature is to add water to the fuel or to separately inject water in the combustion chamber.

However, by adding water phase separation will occur in most fuel systems, especially at lower temperatures, for example below 0° C. EP-A-0 014 992 (BASF) and U.S. Pat. No. 4,356,001 (Sweeney '001) address the problem of water in the fuel composition by including in the fuel polyethers and/or acetals with or without methanol or ethanol. However, when formulating fuel compositions according to the Sweeney '001 patent, one will find that the improved water tolerances are not sufficient in a wider temperature range. The emissions of carbon monoxide, hydrocarbons and soot from such fuels are significantly higher than acceptable emissions.

It is known that alcohol-containing fuels provide relatively low emissions of carbon, carbon oxide and nitrogen oxide (Johnson R. T., Stoffer J. O., Soc. Automot. Eng. (Spec. Publ.) 1983, S.P. 542, 91–104).

A significant part of the developments in the field of hybrid diesel fuels is dedicated to the creation of microemulsions. Microemulsions are thermally stable colloid dispersions in which the particle diameter is on the order of 20–30 Å. In 1977, Backer proposed employing surfactants to form microemulsions of alcohols and hydrocarbons (GB Patent No. 2,002,400). Later, for the same purposes, other emulsifiers were proposed (GB Patent No. 2,115,002; U.S. Pat. Nos. 4,509,950; 4,451,265; and European Patent No. 475,620).

It is possible to achieve a homogeneous composition of diesel fuel incorporating different alcohols and their mixtures. French Patent No. 2453210, to achieve a homogeneous liquid incorporating hydrocarbons and methanol, proposed to add primary aliphatic saturated alcohols of linear and branched structures having from 8 to 15 carbon atoms or mixtures of such alcohols. The avoidance of the separation of the hybrid fuel incorporating the alcohol mixture is also addressed by the European Patent No. 319060.

A study of the performance characteristics of the hybrid fuels confirms the possibility of their use for the operation of diesel engines (Mathur H. B., Babu M. K. Indian Inst. Techn. Journ. Therm. Eng., 1988, 2(3), p. 63–72. Haschimoto, K., et al., Journ. Jap. Petrol. Inst., 1996, v. 39, N2, p. 166–169).

To achieve a homogeneous fuel blend, WO95/02654 proposes using a formulation containing up to 20% of the total volume of ethanol and/or n-propanol, up to 15% of the total volume of fatty acid and/or organic ester, and the remainder comprised of a hydrocarbon liquid. The patent provides examples of compositions in which oleic acid, as well as different organic esters, are used in addition to diesel, ethanol and propanol.

In WO95/02654, all Examples are said to illustrate fuel compositions having a single phase to demonstrate the effectiveness of using certain amounts of fatty acids and/or organic esters, as well as their mixtures, to obtain homogeneous liquids incorporating diesel and low alkyl alcohols in addition to those mentioned above. However, this patent does not provide any temperature limits with regard to stability of the obtained fuel formulations, and is silent as to how the presence of water in the compositions affects stability.

In addition, WO95/02654 fails to teach or suggest use of at least two oxygen-containing organic compounds containing in total at least four specific functional groups.

It is well known that stability of mixtures of lower alcohols and diesel is one of the main operational properties of such fuels. In WO95/02654, tests of several compositions in various standard diesel engines did not show a decrease of power and efficiency of the fuel. However, nothing is said regarding the content of the exhaust emissions of different engines using the proposed fuel formulations. The only comment in that regard is that the use of the ethanol blend over several months in the engine of a Yale Forklift (model GDP 050 RUAS) Mazda XA was likely to be more acceptable with regard to the condition of the air inside the warehouse where the forklift was operated.

The mentioned drawbacks of the fuel compositions of the prior art are eliminated by providing a fuel composition of the present invention.

Contrary to a large number of fuel compositions of the prior art that have been used to replace diesel fuel in part or in total, especially compositions containing carboxylic acids, the fuel of the present invention is essentially non-corrosive.

SUMMARY OF THE INVENTION

It is an object of the present invention to provide a motor fuel composition the use of which can result in a considerable reduction of pollutants in the exhaust emissions, including emissions of $NO_x$, particles and excess carbon dioxide.

It is an additional object of the present invention to provide a motor fuel composition that can be obtained from renewable raw materials.

It is another object of the present invention to provide a motor fuel that may be used in existing, standard automobile or truck engines, including diesel engines, advantageously without any changes in fuel injection synchronisation, valve timing and valve opening time.

It is yet another object of the present invention to provide a motor fuel composition that can allow switching between conventional fuels and fuels according to the present invention without any engine modifications.

It is a further object of the present invention to provide a motor fuel that will remain a homogeneous liquid over a wide range of temperatures even if water is present.

The stable motor fuel composition of the present invention comprises:

(a) an oxygen-containing component comprising at least two oxygen-containing organic compounds, said oxygen-containing organic compounds containing in total at least four oxygen-containing functional groups comprising the following:

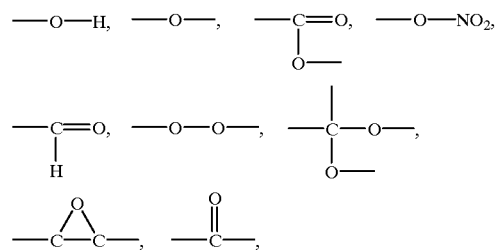

wherein each of said oxygen-containing organic compounds contains at least one of said oxygen-containing groups; and, optionally, (b) a hydrocarbon component.

The motor fuel composition of the present invention can be used to reducing the deposits in a combustion chamber of an engine.

The motor fuel composition of the present invention may be prepared by successively introducing into a fuel reservoir at a constant temperature compounds comprising the motor fuel composition, beginning with a compound having a lowest density at said temperature and terminating with a compound having a highest density at said temperature.

DETAILED DESCRIPTION OF THE INVENTION

In general, the oxygen-containing organic component is present in amounts from about 5% to 100% based on the total volume of the motor fuel composition and, when present, the hydrocarbon component is employed in amounts from 0 to about 95%, based on the total volume of the motor fuel composition.

In general, the motor fuel composition is preferably stable at atmospheric pressure over a temperature range from a cloud temperature of as low as about −35° C. to an initial boiling temperature of about 180° C.

The preferred homogeneous motor fuel composition has a cloud point not higher than about −50° C. and an initial boiling point not lower than about 50° C.

The motor fuel compositions of the present inventor will re-homogenize, if first brought to temperatures below the cloud point or to temperatures above the starting boiling point, so that a phase separation will occur, and then allowed to return to temperatures within the temperature range between the cloud point and the initial boiling point of the specific fuel composition.

The motor fuel composition preferably exhibits at least one, more preferably a portion, and, most preferably, all of the following properties:

(i) density at 20° C. of not less than 0.775 g/cm³;
(ii) the cloud temperature is not higher than 0° C. at atmospheric pressure;
(iii) stable at atmospheric pressure from cloud temperature of 0° C. to initial boiling point of 50° C.;
(iv) amounts of liquid evaporated by boiling at atmospheric pressure;
  not more than 25% of the total volume of the motor fuel composition distills no higher than 100° C.;
  not more than 35% of the total volume of the motor fuel composition distills at temperatures no higher than 150° C.;
  not more than 50% of the total volume of the motor fuel composition distills at temperatures no higher than 200° C.;

not less than 98% of the total volume of the motor fuel composition distills at temperatures no higher than 400° C., suitably no higher than 370° C.; and preferably no higher than 280° C.;

(v) heat of combustion on oxidation by oxygen of not less than 39 MJ/kg;

(vi) self-ignition temperature from 150° C. to 300° C.

(vii) ability to accommodate at least 1% water by volume.

The motor fuel composition is preferably produced by successively introducing into a fuel reservoir at the same temperature, the components of the motor fuel composition beginning with the component having the least density at that temperature and terminating with the component having the highest density at that temperature.

A heavier hydrocarbon fraction may be employed in combination with the oxygen-containing components. The hydrocarbon fraction employed is generally any hydrocarbon mixture, such as a petroleum fraction, meeting ASTM specifications for diesel fuel. Depending on grade, actual hydrocarbon fractions will vary. No. 2 diesel fuel, having its European counterpart in EN 590 diesel fuel, is most commonly used in commercial and agricultural vehicles and, increasingly, in private vehicles. Of course, other hydrocarbon fractions lighter than the diesel fraction, including kerosene, as well as fractions heavier than the diesel fraction, including gas oil and fuel oil, could be used in the present motor fuel, to replace the diesel fraction.

The hydrocarbon component of the instant motor fuel composition, when employed, is preferably a diesel fraction. The diesel fraction is preferably a mixture of a diesel oil and the hydrocarbon fraction lighter than the diesel oil. It is also possible to employ a hydrocarbon liquid obtained from a renewable raw material as a component of the motor fuel for diesel engines. It is preferred to employ the hydrocarbon liquids obtained from turpentine or rosin, as well as hydrocarbon liquids produced by processing of oxygen containing compounds.

The hydrocarbon component of the motor fuel for diesel engines, when employed, can be produced from synthesis-gas, or natural gas and coal.

Examples of oxygen-containing components containing a total of at least 4 oxygen-containing functional groups include:

ethanol 2-ethoxyhexylglycidyl ether propanol acetaldehyde diethyl acetal formaldehyde diethyl acetal ethanol methanol tertbutyl peroxyacetate propanol methyl acetate ethyl formate ethyl oleate tertbutyl peroxyacetate isobutyl aldehyde di-octyl ether n-amyl nitrate propanol Preferably, at least one of methanol or ethanol, and, optionally, products derived from said methanol and/or ethanol, are present in the oxygen-containing compound component. The components of the motor fuel may contain contaminants, which reduce the time and expense in processing the components for use in the fuel.

In a preferred embodiment of the invention, water amounts up to about 1% based on the total volume of the motor fuel composition may be present without significantly and undesirably affecting the properties and homogeneity of the motor fuel compositions. Accordingly, commercially available components and hydrocarbon fractions that contain water as a contaminant need not necessarily be treated to remove water prior to being incorporated in the motor fuel.

It is also a preferred feature of the invention to use an oxygen-containing organic component from produced from a renewable plant resource.

According to a preferred embodiment of the invention, for a fuel composition providing a shorter delay period in the ignition of the motor fuel, the organic compounds containing bound oxygen preferably have a linear or sparsely branched molecular structure. "Sparsely branched" may be understood to include compounds with only one side-chain.

According to another preferred embodiment of the invention, the temperature of self-ignition of a fuel composition comprising organic compounds with bound oxygen in a branched molecular structure is between about 150° C. and 300° C., so that the operation efficiency is not reduced.

In accordance with a further preferred embodiment of the invention a fuel composition is provided for an efficient operation of engines that results in reduction of pollutants in the exhaust emissions, without the addition of hydrocarbons. For this purpose, only the organic compounds containing bound oxygen are employed.

An oxygen-containing component that completely replaces hydrocarbon fuel can preferably comprise any two of tetrahydrofurfuryl alcohol, tert-butyl peroxyacetate, 1,2-epoxy-4-epoxycyclohexane and di-ethoxypropane. For example, such a motor fuel composition can comprise 67% tetrahydrofurfuryl alcohol and 33% tert-butyl peroxyacetate.

Another oxygen-containing component that completely replaces hydrocarbon fuel can comprise i) one of methyl-epoxytallowate or 2-ethylhexylglycidyl ether and ii) one of ethanol, propanol, hexanol, dibutyl ether, dihexyl ether, di-n-amyl ether, isopropyl nitrate.

The compounds that can completely replace hydrocarbon fuel are not limited to the examples presented above.

The instant motor fuel composition can be utilized under conditions of either reduced and/or increased ambient temperature with satisfactory efficiency in operation.

In accordance with a further preferred embodiment of the invention, oxygen-containing components can provide the required lubrication properties of the motor fuel, which are of particular importance for proper operation of a diesel engine. The lubricating properties may be provided by esters with long hydrocarbon chains, preferably from 11 to 20 carbons. Such esters are preferably synthesized by reacting higher alcohols with lower acids or lower alcohols with higher acids.

According to another preferred embodiment of the invention, oxygen containing components reduce deposits in the combustion chamber of the engine.

The oxygen-containing component of the motor fuel of the invention preferably includes (i) alcohols, (ii) ethers, (iii) organic esters and (iv) at least one of aldehyde, ketone, inorganic ester, acetal, epoxide and peroxide, and, preferably, all compounds listed in (iv).

In a most preferred embodiment, the fuel composition of the invention comprises at least one compound of each of the different classes in groups (i) through (iv) above.

Mixtures of alcohols, such as (i) ethanol and butanol, (ii) ethanol, propanal and hexanol, (iii) methanol and ethanol, (iv) ethanol, butanol and hexanol and (v) ethanol, propanol, butanol, pentanol, ethyl-hexanol, and trimethylnonanol and the like may preferably be employed as the alcohol component. Further, mixtures of ethers and mixtures of organic esters may also be utilized for the ether or organic ester component, respectively, with satisfactory results. Likewise, mixtures of any of acetals, epoxides, peroxides, aldehydes, ketones and inorganic esters may be employed for such components.

When a total of three or fewer oxygen-containing functional groups are employed to form the instant motor fuel composition for diesel engines, it has been found that it is difficult to readily form a homogeneous, single phase fuel. For example, when diesel oil is combined with ethanol, oleic acid and isopropyl oleate, as in Composition 10 of WO95/02654, by adding to diesel oil ethanol, oleic acid and isopropyl oleate. The mixture is permitted to stand for an hour, and a multi-phase composition is generally observed. Only with substantial shaking does the phase separation disappear. To the contrary, in the present invention, where a total of four different oxygen-containing functional groups are employed in at least two oxygen-containing organic compounds and the components are mixed in order of increasing density and the mixture allowed to stand for at least about an hour, a single phase mixture is obtained without the need for additional mixing.

The oxygen-containing component can include an alcohol. In general, aliphatic alcohols, preferably alkanols, and mixtures thereof are employed. More preferably, alkanols of the general formula: R—OH, in which R is alkyl with 1 to 10 carbon atoms, most preferably 2 to 8 carbon atoms, such as ethanol, n-, iso- or sec-butyl, or amyl alcohol, 2-ethylhexanol, or 2,6,8-trimethyl-4-nonanol are employed.

The fuel additive can include an aldehyde of the general formula

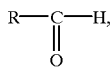

where R is a $C_1$–$C_8$, hydrocarbon.

Preferred aldehydes include formaldehyde, ethylaldehyde, butylaldehyde, isobutylaldehyde and ethylhexylaldehyde.

The fuel additive can include a ketone of the general formula

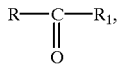

wherein R and $R_1$ each are a $C_1$–$C_8$ hydrocarbon residue, the same or different or, together, form a cyclic ring, the total number of carbon atoms of R and $R_1$ being 3 to 12. The preferred ketones of the invention include diisobutyl ketone, ethylamyl ketone, carvon, and menthone.

The ether fuel additive preferably includes a monoether, a diether and/or a cycloether. A preferred ether has the general formula R—O—R', wherein R and R' are the same or different and are each a $C_2$–$C_{10}$ hydrocarbon group or, together, form a cyclic ring. In general, lower ($C_4$–$C_8$) dialkyl ethers are preferred. The total number of carbon atoms in the ether is preferably from 8 to 16.

Typical monoethers include dibutyl ether, tert-butyl isobutyl ether, ethylbutyl ether, diisoamyl ether, dihexyl ether and diisooctyl ether. Typical diethers include dimethoxy propane and diethoxy propane. Typical cycloethers include cyclic mono, di, and heterocyclic ethers such as dioxane, methyl tetrahydrofuran, methyl tetrahydropyran, and tetrahydrofurfuryl alcohol.

The ester additive may be an ester of an organic acid of the general formula

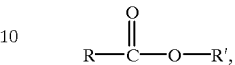

where R and R' are the same or different. R and R' are preferably hydrocarbon groups. Preferably, they are $C_1$–$C_8$ alkyl esters of $C_1$–$C_{22}$ saturated or unsaturated fatty acids. Typical esters include ethyl formate, methyl acetate, ethyl acetate, propyl acetate, isobutyl acetate, butyl acetate, isoamyl acetate, octyl acetate, isoamyl propionate, methyl butyrate, ethyl butyrate, butylbutyrate, ethyl oleate, ethyl caprylate, rape seed oil methyl ester, isobornylmethacrylate and the like.

The acetal fuel additive can have the general formula:

$$RCH(OR')_2$$

wherein R is hydrogen or a hydrocarbon, preferably lower alkyl, i.e. ($C_1$–$C_3$) and R' is $C_1$–$C_4$ alkyl, such as methyl, ethyl or butyl. Typical acetals include formaldehyde dimethyl acetal, formaldehyde diethyl acetal, acetaldehyde diethyl acetal and acetaldehyde dibutyl acetal.

The oxygen-containing compound of the invention can be an inorganic acid ester; that is, an organic ester of an inorganic acid. A typical inorganic acid is nitric acid and the organic moiety can be a hydrocarbon, preferably alkyl or alicyclic. Typical examples of the inorganic acid ester include cyclohexyl nitrate, isopropyl nitrate, n-amyl nitrate, 2-ethylhexyl nitrate, and iso-amyl nitrate.

The oxygen containing compound can be an organic peroxide. Typical organic peroxides are of the formula R—O—O—R' where R and R' are each the same or different and can be, for example, alkyl or oxygen-substituted alkyl, such as alkanoic. Examples of organic peroxides include tert-butyl peroxyacetate and di-tert butyl peroxide. Because of the cleavage of the oxygen-oxygen bond, in the present invention, a hydroperoxide is considered to have two oxygen-containing functional groups: an ether group and a hydroxy group.

The oxygen containing compound can be an organic epoxide. Typical organic epoxides have the general formula

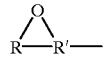

where R and R' are $C_1$–$C_{12}$, and are the same or different and are hydrocarbons, preferably alkyl and alkanoic. Typical epoxides include 1,2-epoxy-4-epoxy ethylcyclohexane, epoxidised methyl ester of tall oil and ethylhexylglycidyl ether.

The oxygen-containing fuel additives are employed in effective amounts to provide a homogenous motor fuel and an efficient fuel having reduced emissions. Usually, at least about 5% by volume of oxygen containing additive is employed. Further, a completely hydrocarbon-free fuel, which is 100% oxygen-containing component, can be employed.

The minimum amount of any of the at least four functional groups, calculated as the total volume of the compound(s) exhibiting the particular group, should not be lower than 0.1%, suitably not lower than 0.5%, and preferably not lower than 1% of the total volume of the fuel composition.

In general, the alcohol is preferably employed in amounts from about 0.1 to 35% by volume; the aldehyde in amounts from about 0 to 10% by volume, the ether in amounts from about 0.1 to 65% by volume, the organic ester in amounts from about 0.1 to 20% by volume, the acetal in amounts from 0 to 10% by volume, the inorganic ester in amounts from about 0 to 2% by volume, the peroxide in amounts from about 0 to 2% by volume, and the epoxide in amounts from about from about 0 to 10%, although greater and lesser amounts can be employed depending on the particular circumstances for a given motor fuel composition useful in a diesel engine.

The alcohol, or any other component of the fuel composition, may be present as a by-product contained in any of the other components.

The organic compounds containing bound oxygen can be derived from fossil-based sources or from renewable sources as biomass.

As non-limiting examples demonstrating the effectiveness of this invention, the illustrative motor fuel compositions that are described hereafter are particularly suitable for the operation of diesel, gas-turbine and turbojet engines, including standard types of engines, without any modification thereof.

EXAMPLE 1

Motor Fuel Composition 1 prepared below demonstrates that even when a very small quantity of organic compounds containing bound oxygen is employed, these compounds still provide a noticeable reduction of pollutants in the exhaust emissions of a standard diesel engine.

The content by volume of components in the Motor Fuel Composition 1 is as follows: formaldehyde diethyl acetal—1%; 1-butanol—1%; di-n-amyl ether—1.75%; octyl acetate—1%; isopropyl nitrate—0.25%; and hydrocarbon liquid (diesel fuel according to standard EN 590)—95%.

The fuel components were added to a common tank starting with the component with the lowest density and ending with the component having the greatest density. The resulting motor fuel composition had the following characteristics:

| | |
|---|---|
| Density at 20° C. | 0.811 g/cm³ |
| Temperature limits of evaporation by boiling of the liquid at atmospheric pressure | |
| up to 100° C. | 1% |
| up to 150° C. | 2.25% |
| up to 200° C. | 14.5% |
| up to 370° C. | 98.0% |
| Heat of combustion | 42.8 MJ/kg |
| Thermal stability | Motor Fuel Composition 1 was a homogeneous liquid, stable at atmospheric pressure over a range of temperatures from −18° C. (cloud temperature) to 88° C. (initial boiling temperature). |

An analysis of the amount of pollutants in the exhaust emissions from a standard diesel engine of the VW GOLF CL DIESEL automobile, engine family: Dl-W03-92 when executing Test Type, —Modified European Driving Cycle (NEDC UDC+EUDC) ECE OICA (91/441/EEC) on Motor Fuel Composition 1 showed a reduction in particles (g/km) of 5% compared to the results obtained for 100% diesel fuel (EN590:1993).

The use of Motor Fuel Composition 1 in the operation of a standard diesel truck engine, engine type VOLVO TD61GS No. 0580026, with power and torque settings: kW/Nm/rpm=140/520/1900, for measurements over the range of 1000–2600 rpm, showed a decrease in the values of power and torque of less than 1% in comparison with the values obtained for the same engine operating on 100% diesel fuel (EN590:1993).

Similar results were obtained when employing the Motor Fuel Composition 1 for operation of the standard ship gas-turbine engine.

EXAMPLE 2

Motor Fuel Composition 2 produced a significant decrease of pollutants in the exhaust emissions of a standard diesel engine operating with an inexpensive fuel composition of organic compounds containing bound oxygen and a hydrocarbon liquid.

The content by volume of the components in Motor Fuel Composition 2 is as follows: ethanol—3%; 1-butanol—2.5%; dimethoxypropane—3%; tetrahydrofuran—1.5%; tert-butyl hydroperoxide—0.5%; and hydrocarbon liquid (Mk1 diesel fuel SS 15 54 35)—89.5%.

The fuel composition had the following characteristics:

| | |
|---|---|
| Density at 20° C. | 0.817 g/cm³ |
| Temperature limits of evaporation by boiling of the liquid at atmospheric pressure: | |
| up to 100° C. | 8% |
| up to 150° C. | 10.5% |
| up to 200° C. | 19.5% |
| up to 285° C. | 95.5% |
| Heat of combustion | 41.9 MJ/kg |
| Thermal stability | Motor Fuel Composition 2 is a homogeneous liquid, stable at atmospheric pressure over a range of temperatures from −30° C. (cloud temperature) to 70° C. (initial boiling temperature). |

An analysis of the amount of pollutants in the exhaust emissions from a standard diesel engine of the VW Passat TDI 1.9 automobile, model 1997, Engine Family 2Dl-WDE-95, power kW/rpm=81/4150 according to the Test Type—Modified European Driving Cycle (NEDC UDC+EUDC) ECE OICA (91/441/EEC) for Motor Fuel Composition 2, in comparison with 100% Mk1 diesel fuel (SS 15 54 35), showed a reduction in the amounts of CO (g/km) of 12%; HC+NO$_x$ (g/km) of 5.75% and particles (g/km) of 11.5%.

An analysis of the amount of the pollutants in the exhaust emissions from a standard diesel truck engine, Engine Type: VOLVO D7C 290 EUR02 No. 1162 XX, power kw/rpm= 213/2200 according to the Test Type: ECE R49 A30 Regulation for fuel composition 2, compared to 100% Mk1 diesel fuel (SS 15 54 35), showed a reduction in the amounts of: CO (g/kW) of 6%; HC+NO$_x$ (g/kW) of 0%, and particles (g/kw) of 4%.

The power (PkW) of the engine when operating on Motor Fuel Composition 2 decreased only by 2.8%, and the fuel consumption (1/kW) slightly increased by 2% compared to the results obtained for the same engine operating on 100% Mk1 diesel fuel (SS 15 54 35).

EXAMPLE 3

Motor Fuel Composition 3 produced a significant decrease of pollutants in the exhaust emissions of a standard diesel engine operating with an inexpensive fuel composition of organic compounds containing bound oxygen and a hydrocarbon liquid, which was a mixture of hydrocarbons obtained from a synthesis-gas "synthin".

The content by volume of the components in Motor Fuel Composition 3 is as follows: ethanol—3%; 1-butanol—2.5%; dimethoxypropane—3%; ethyl acetate—1.5%; tert-butyl hydroperoxide—0.5%; and hydrocarbon liquid (hydrocarbon mixture obtained from synthesis-gas with catalyst under atmospheric pressure and temperatures of 170–200° C.)—89.5%.

The fuel composition had the following characteristics:

| | |
|---|---|
| Density at 20° C. | 0.817 g/cm$^3$ |
| Temperature limits of evaporation by boiling of the liquid at atmospheric pressure: | |
| up to 100° C. | 7% |
| up to 150° C. | 10.5% |
| up to 200° C. | 19.5% |
| up to 285° C. | 95.5% |
| Heat of combustion | 41.7 MJ/kg |
| Thermal stability | Motor Fuel Composition 3 is a homogeneous liquid, stable at atmospheric pressure over a range of temperatures from −30° C. (cloud temperature) to 70° C. (initial boiling temperature). |

An analysis of the amount of pollutants in the exhaust emission from a standard diesel engine of the VW Passat TDI 1.9 automobile, model 1997, Engine Family 2Dl-WDE-95, power kW/rpm=81/4150 according to the Test Type—Modified European Driving Cycle (NEDC UDC+EUDC) ECE OICA (91/441/EEC) for Motor Fuel Composition 3, showed a reduction in the amounts of CO (g/km) of 18%; HC+NO$_x$ (g/km) of 5.05% and particles (g/km) of 21.5%, compared to 100% Mk1 diesel fuel (SS 15 54 35).

An analysis of the amount of the pollutants in the exhaust emissions from a standard diesel truck engine, Engine Type: VOLVO D7C 290 EUR02 No. 1162 XX, power kW/rpm=213/2200 according to the Test Type: ECE R49 A30 Regulation for fuel composition 3, in comparison with 100% Mk1 diesel fuel (SS 15 54 35), showed a reduction in the amounts of: CO (g/kW) of 11%; HC+NO$_x$ (g/kW) of 4.8%, and particles (g/kw) of 17%.

The power (PkW) of the engine when operating on Motor Fuel Composition 3 decreased only by 1.2%, and the fuel consumption (1/kW) slightly increased by 0.5% in comparison to the results obtained for the same engine operating on 100% Mk1 diesel fuel (SS 15 54 35).

EXAMPLE 4

Motor Fuel Composition 4 demonstrated the effects of operating a standard diesel engine with a fuel composition of organic compounds containing bound oxygen and a hydrocarbon liquid containing lighter fractions of petroleum products in addition to diesel fuel.

The content by volume of the components in the fuel composition were as follows: ethanol—8%; 1-butanol—2%; diethyl acetaldehyde—0.5%; ethyl acetate—4%; ethyl butyrate—3%; acetaldehyde diethyl acetal—0.5%; di-n-amyl ether—8%; ethyl oleate—8%; tert-butyl peroxyacetate—1%; hydrocarbon liquid—65%; containing 15% kerosene and 50% Mk1 diesel fuel (SS 15 54 35).

The fuel composition had the following characteristics:

| | |
|---|---|
| Density at 20° C. | 0.775 g/cm$^3$ |
| Temperature limits of evaporation of the liquid by boiling at atmospheric pressure: | |
| up to 100° C. | 12% |
| up to 150° C. | 19% |
| up to 200° C. | 43% |
| up to 285° C. | 96% |
| Heat of combustion | 40.2 MJ/kg |
| Thermal stability | Motor Fuel Composition 4 is a homogeneous liquid stable at atmospheric pressure over a range of temperatures from −37° C. (cloud temperature) to 70° C. (initial boiling temperature). |

An analysis of the amount of pollutants in the exhaust emissions from a standard diesel engine of the VW Passat TDI 1.9 automobile, model 1997, Engine Family 2Dl-W-DE-95, power kW/rpm=81/4150 according to the Test Type—Modified European Driving Cycle (NEDC UDC+ EUDC) ECE OICA (91/441/EEC) for Motor Fuel Composition 4, showed a reduction in the amounts of CO (g/km) of 27.7%, HC+NO$_x$ (g/km) of 12.6% and particles (g/km) of 17% in comparison with 100% Mk1 diesel fuel (SS 15 54 35).

When Motor Fuel Composition 4 was employed the operation of a standard diesel truck engine, engine type VOLVO TD61GS No. 0580026, with power and torque settings: kW/Nm/rpm=140/520/1900, the resulting measurements over the range of 1000–2600 rpm showed a decrease of less than 3.5% in power and torque values in comparison with the values obtained for the same engine operating on the 100% Mk1 diesel fuel (SS 15 54 35).

EXAMPLE 5

Motor Fuel Composition 5 demonstrated the effects of operating a standard engine with a fuel composition of organic compounds containing bound oxygen and a hydrocarbon liquid containing a kerosene fraction of petroleum products in addition to synthetic motor fuel.

The content by volume of the components in the fuel composition were as follows: 1-butanol—1%; 2-ethyl hexanol—3%; 2-ethylhexyl acetate—1%; isoamyl alcohol—1%; di-isoamyl ether—2%; tetrahydrofurfuryl alcohol—1.5%; iso-amyl nitrate—0.5%; hydrocarbon liquid—90%, containing 40% of kerosene and 50% synthin (a hydrocarbon mixture obtained from synthesis-gas with catalyst under atmospheric pressure and temperatures of 150–280° C.).

The fuel composition had the following characteristics:

| | |
|---|---|
| Density at 20° C. | 0.805 g/cm³ |
| Temperature limits of evaporation of the liquid by boiling at atmospheric pressure: | |
| up to 100° C. | 0% |
| up to 150° C. | 2% |
| up to 200° C. | 43.5% |
| up to 280° C. | 99% |
| Heat of combustion | 43.3 MJ/kg |
| Thermal stability | Motor Fuel Composition 5 is a homogeneous liquid stable at atmospheric pressure over a range of temperatures from −60° C. (cloud temperature) to 70° C. (initial boiling temperature). |

An analysis of the amount of pollutants in the exhaust emissions from a standard diesel engine of the VW Passat TDI 1.9 automobile, model 1997, Engine Family 2Dl-W-DE-95, power kW/rpm=81/4150 according to the Test Type—Modified European Driving Cycle (NEDC UDC+EUDC) ECE OICA (91/441/EEC) for Motor Fuel Composition 5, showed a reduction in the amounts of CO (g/km) of 12.6%, HC+NO$_x$ (g/km) of 7.4% and particles (g/km) of 26% in comparison with 100% Mk1 diesel fuel (SS 15 54 35).

When Motor Fuel Composition 5 was employed, the operation of a standard diesel truck engine, engine type VOLVO TD61GS No. 0580026, with power and torque settings: kW/Nm/rpm=140/520/1900, the resulting measurements over the range of 1000–2600 rpm showed less than a 17% decrease in power and torque values in comparison with the values obtained for the same engine operating on the 100% Mk1 diesel fuel (SS 15 54 35).

Similar results for power and exhaust emission changes were obtained when employing the Motor Fuel Composition 5 for operation of a standard aeroplane jet engine.

EXAMPLE 6

Motor Fuel Composition 6 demonstrated the possibility of using, for operating a standard diesel engine, a fuel composition of organic compounds containing bound oxygen and a hydrocarbon liquid in which the concentration of the hydrocarbon component in the composition was less than 40% by volume.

The content by volume of the components in Motor Fuel Composition 6 is: ethanol—4.5%; propanol—5.5%; hexanol—15%; dibutyl ether—8.5%; ethyl caprylate—10%; dihexyl ether—16%; di-tert-butyl peroxide—1.5%; and hydrocarbon liquid (diesel fuel EN 590: 1993)—39%.

The fuel composition had the following characteristics:

| | |
|---|---|
| Density at 20° C. | 0.819 g/cm³ |
| Temperature limits of evaporation by boiling of the liquid at atmospheric pressure: | |
| up to 100° C. | 10% |
| up to 150° C. | 20% |
| up to 200° C. | 39% |
| up to 370° C. | 98% |
| Heat of combustion | 40.4 MJ/kg |
| Thermal stability | Motor Fuel Composition 6 was a homogeneous liquid stable at atmospheric pressure over a range of temperatures from −35° C. (cloud temperature) to 78° C. (initial boiling temperature). |

An analysis of the amount of pollutants in the exhaust emission from a standard diesel engine of the Audi A6 TDI 1.9 automobile, model 1998 according to the Test Type—Modified European Driving Cycle (NEDC UDC+EUDC) ECE OICA (91/441/EEC), for Motor Fuel Composition 6, in comparison with 100% Mk1 diesel fuel (EN 590: 1993), showed a reduction in the amounts of CO (g/km) of 0%, HC+NO$_x$ g/km) of 14% and particles (g/km) of 46%.

EXAMPLE 7

Motor Fuel Composition 7 demonstrated the possibility of using, for operating a standard diesel engine, a fuel composition of organic compounds containing bound oxygen and a hydrocarbon liquid in which the concentration of the hydrocarbon component was less than 40% by volume, and wherein the hydrocarbon mixture was obtained from a liquid fraction obtained in mineral coal coking.

The content by volume of the components in Motor Fuel Composition 7 is: ethanol—4.5%; propanol—5.5%; hexanol—15%; dibutyl ether—8.5%; ethyl caprylate—10%; dihexyl ether—16%; 2-ethylhexylglycidyl ether—1.5%; and hydrocarbon liquid—39%, obtained from mineral coal processing, and including 9% of decalin.

The fuel composition had the following characteristics:

| | |
|---|---|
| Density at 20° C. | 0.820 g/cm³ |
| Temperature limits of evaporation by boiling of the liquid at atmospheric pressure: | |
| up to 100° C. | 10% |
| up to 150° C. | 18.5% |
| up to 200° C. | 39% |
| up to 400° C. | 98% |
| Heat of combustion | 40.4 MJ/kg |
| Thermal stability | Motor Fuel Composition 7 was a homogeneous liquid stable at atmospheric pressure over a range of temperatures from −35° C. (cloud temperature) to 78° C. (initial boiling temperature). |

An analysis of the amount of pollutants in the exhaust emission from a standard diesel engine of the Audi A6 TDI 1.9 automobile, model 1998 according to the Test Type—Modified European Driving Cycle (NEDC UDC+EUDC) ECE OICA (91/441/EEC), for Motor Fuel Composition 7 in comparison with 100% diesel fuel (EN 590: 1993), showed a reduction in the amounts of CO (g/km) of 8%, HC+NO$_x$ (g/km) of 12% and particles (g/km) of 45%.

Similar results were obtained when employing the Motor Fuel Composition 7 for operation of a standard ship gas-turbine engine.

EXAMPLE 8

Motor Fuel Composition 8 demonstrated the possibility of using, for operating a diesel engine, a fuel composition made from a hydrocarbon liquid and from organic compounds containing bound oxygen that can be obtained by processing methanol and ethanol.

The content by volume of the components in Motor Fuel Composition 8 is: methanol—1.5%; ethanol—3%; formaldehyde dimethyl acetal—2%; formaldehyde diethyl acetal—3%; acetaldehyde diethyl acetal—3%; methyl acetate—1%; ethyl formate—1%; rape seed oil methyl ester—5%; ethyl oleate—5%; tert-butyl peroxyacetate—0.5%; hydrocarbon liquid (kerosene)—75%.

The fuel compositions had the following characteristics:

| | |
|---|---|
| Density at 20° C. | 0.791 g/cm$^3$ |
| Temperature limits of evaporation of the liquid by boiling at atmospheric pressure: | |
| up to 100° C. | 11.5% |
| up to 150° C. | 15% |
| up to 200° C. | 25% |
| up to 280° C. | 97.5% |
| Heat of combustion | 40.4 MJ/kg |
| Thermal stability | Fuel composition 8 was a homogeneous liquid stable at temperature from −48° C. (cloud temperature) to 52.5° C. (initial boiling temperature). |

An analysis of the amount of pollutants in the exhaust emissions from a standard diesel engine of the VW Passat TDI 1.9 automobile, model 1997, engine family 2Dl-WDE-95, power kW/rpm=81/4150 according to the Test Type—Modified European Driving Cycle (NEDC UDC+EUDC) ECE OICA (91/441/EEC) for Motor Fuel Composition 8, in comparison with 100% Mk1 diesel fuel (SS 15 54 35), showed a reduction in the amounts of CO (g/km) of 18%, HC+NO$_x$ (g/km) of 8.6% and particles (g/km) of 31.6%.

The use of Motor Fuel Composition 8 for the operation of a standard diesel truck engine, engine type VOLVO TD61GS No. 0580026, with power and torque settings: kW/Nm/rpm=140/520/1900, for measurements over the range of 1000–2600 rpm, showed less than a 4% decrease in power and torque values in comparison with the results obtained for the same engine operated with 100% Mk1 diesel fuel (SS 15 54 35).

EXAMPLE 9

Motor Fuel Composition 9 demonstrated the possibility of using, for operating a diesel engine, a fuel composition made from organic compounds containing bound oxygen that can be obtained by processing methanol and ethanol and a hydrocarbon liquid obtained in processing of turpentine and rosin.

The content by volume of the components in Motor Fuel Composition 9 is: methanol—1.5%; ethanol—3%; formaldehyde dimethyl acetal—2%; formaldehyde diethyl acetal—3%; acetaldehyde diethyl acetal—3%; methyl acetate—1%; ethyl formate—1%; tall oil methyl ester—10%, including methyl abietate—3.5%; tert-butyl peroxyacetate—0.5%; hydrocarbon liquid—75% (a mixture of hydrocarbons obtained by processing turpentine and rosin, comprising methane—45%, abiethane—10%, and the remaining part of other terpene hydrocarbons).

The fuel compositions had the following characteristics:

| | |
|---|---|
| Density at 20° C. | 0.821 g/cm$^3$ |
| Temperature limits of evaporation of the liquid by boiling at atmospheric pressure: | |
| up to 100° C. | 11.5% |
| up to 150° C. | 15% |
| up to 200° C. | 25% |
| up to 400° C. | 98.75% |
| Heat of combustion | 40.4 MJ/kg |
| Thermal stability | Fuel composition 9 was a homogeneous liquid stable at atmospheric pressure over a range of temperature from −33° C. (cloud temperature) to 52.5° C. (initial boiling temperature). |

An analysis of the amount of pollutants in the exhaust emissions from a standard diesel engine of the VW Passat TDI 1.9 automobile, model 1997, engine family 2Dl-WDE-95, power kW/rpm=81/4150 according to the Test Type—Modified European Driving Cycle (NEDC UDC+EUDC) ECE OICA (91/441/EEC), for Motor Fuel Composition 9, in comparison with 100% Mk1 diesel fuel (SS 15 54 35), showed a reduction in the amounts of CO (g/km) of 16%, HC+NO$_x$ (g/km) of 10.5% and particles (g/km) of 40.5%.

The use of Motor Fuel Composition 9 for the operation of a standard diesel truck engine, engine type VOLVO TD61GS No. 0580026, with power and torque settings: kW/Nm/rpm=140/520/1900, for measurements over the range of 1000–2600 rpm, showed less than a 3% decrease in power and torque values in comparison with the results obtained for the same engine operated with 100% Mk1 diesel fuel (SS 15 54 35).

Similar results were obtained when employing the Motor Fuel Composition 9 for operation of a standard ship gas-turbine engine.

EXAMPLE 10

Motor Fuel Composition 10 demonstrated the possibility of using, for operating a diesel engine, a fuel composition of a hydrocarbon liquid and of organic compounds containing bound oxygen that are not thoroughly purified technical products.

The content by volume of the components in the Motor Fuel Composition 10 is: ethanol—4.5%; propanol—12.5%; 1-butanol—1%; isobutanol—0.5%; 1-pentanol—1.5%; 2-ethylhexanol—9.5%; ethyl acetate—1%; propyl acetate—6%; isobutyl acetate—0.1%; amyl acetate—0.4%; butyl aldehyde—0.8%; isobutyl aldehyde—0.2%; dibutyl ether—6.5%; di-octyl ether—5%; n-amyl nitrate—0.5%; and hydrocarbon liquid (diesel fuel SS 15 54 35 Mk1)—50%.

The fuel composition had the following characteristics:

| | |
|---|---|
| Density at 20° C. | 0.815 g/cm$^3$ |
| Temperature limits of evaporation of the liquid by boiling at atmospheric pressure: | |
| up to 100° C. | 25% |
| up to 150° C. | 35% |

| | |
|---|---|
| up to 200° C. | 50% |
| up to 285° C. | 97.5% |
| Heat of combustion | 39.0 MJ/kg |
| Self-ignition temperature | 300° C. |
| Thermal stability: | Motor Fuel Composition 10 was a homogeneous liquid stable at atmospheric pressure over a range of temperature from −35° C. (cloud temperature) to 64° C. (initial boiling temperature). |

An analysis of the amount of pollutants in the exhaust emissions from a standard diesel engine of the VW GOLF CL DIESEL automobile, Engine Family: Dl-W03-92 when executing Test Type—Modified European Driving Cycle (NEDC UDC+EUDC) ECE OICA (91/441/EEC) for Motor Fuel Composition 10, in comparison with the results obtained for 100% Mk1 diesel fuel (SS 15 54 35), showed a reduction in the amounts of CO (g/km) of 16.9%, HC+NO$_x$ (g/km) of 5.9% and particles (g/km) of 23.7%.

The use of Motor Fuel Composition 10 for the operation of a standard diesel truck engine, engine type VOLVO TD61GS No. 0580026, with power and torque settings: kW/Nm/rpm=140/520/1900, for measurements over the range of 1000–2600 rpm, showed less than a 5% decrease in the values of power and torque of less than 5% in comparison with the corresponding values obtained for the same engine operating with 100% Mk1 diesel fuel (SS 15 54 35).

EXAMPLE 11

Motor Fuel Composition 11 demonstrated the possibility of using, for operating a standard diesel engine, a fuel composition of organic compounds containing bound oxygen that are not thoroughly purified technical products and a hydrocarbon component comprising kerosene, synthin, hydrogenated turpentine and a hydrogenated liquid fraction obtained in mineral coal coking.

The content by volume of the components in the Motor Fuel Composition 11 is: ethanol—4.5%; propanol—12.5%; 1-butanol—1%; isobutanol—0.5%; 1-pentanol—1.5%; 2-ethylhexanol—9.5%; ethyl acetate—1%; propyl acetate—6%; isobutyl acetate—0.1%; amyl acetate—0.4%; butyl aldehyde—0.8%; isobutyl aldehyde—0.2%; dibutyl ether—6.5%; di-octyl ether—5%; n-amyl nitrate—0.5%; and hydrocarbon liquid (comprising a terpene fraction—10%, including menthane—8%; kerosene—10% and synthin—20%, including linear saturated hydrocarbons—18%, and a hydrogenated liquid fraction obtained in mineral coal coking—10%, including decalin—2%)—50%.

The fuel composition had the following characteristics:

| | |
|---|---|
| Density at 20° C. | 0.815 g/cm³ |
| Temperature limits of evaporation of the liquid by boiling at atmospheric pressure: | |
| up to 100° C. | 25% |
| up to 150° C. | 35% |
| up to 200° C. | 50% |
| up to 400° C. | 98.5% |
| Heat of combustion | 39.0 MJ/kg |
| Self-ignition temperature | 300° C. |
| Thermal stability: | Motor Fuel Composition 11 was a homogeneous liquid stable at atmospheric pressure over a range of temperature from −35° C. (cloud temperature) to 64° C. (initial boiling temperature). |

An analysis of the amount of pollutants in the exhaust emissions from a standard diesel engine of the VW GOLF CL DIESEL automobile, Engine Family: Dl-W03-92 when executing Test Type—Modified European Driving Cycle (NEDC UDC+EUDC) ECE OICA (91/441/EEC) for Motor Fuel Composition 11, in comparison with the results obtained for 100% Mk1 diesel fuel (SS 15 54 35), showed a reduction in the amounts of CO (g/km) of 16.9%, HC+NO$_x$ (g/km) of 5.9% and particles (g/km) of 23.7%.

The use of Motor Fuel Composition 11 for the operation of a standard diesel truck engine, engine type VOLVO TD61GS No. 0580026, with power and torque settings: kW/Nm/rpm=140/520/1900, for measurements over the range of 1000–2600 rpm, showed less than a 5% decrease in power and torque values in comparison with the corresponding values obtained for the same engine operating with 100% Mk1 diesel fuel (SS 15 54 35).

EXAMPLE 12

Motor Fuel Composition 12 demonstrated the possibility of using, for operating a standard diesel engine, a fuel composition of a hydrocarbon liquid and organic compounds containing bound oxygen that is useful at elevated temperatures.

The content by volume of components in Motor Fuel Composition 12 is: 1-octanol—2%; ethyl oleate—4%; ethyl caprylate—2.5%; di-n-amyl ether 4%; di-octyl ether—15%; acetaldehyde dibutyl acetal 2%; cyclohexyl nitrate—0.5%; and hydrocarbon liquid (Mk1 diesel fuel SS 15 54 35)—70%.

The fuel composition had the following characteristics:

| | |
|---|---|
| Density at 20° C. | 0.816 g/cm³ |
| Temperature limits of evaporation of the liquid by boiling at atmospheric pressure: | |
| up to 100° C. | 0% |
| up to 150° C. | 0% |
| up to 200° C. | 19.5% |
| up to 285° C. | 96.5% |
| Flash point | not lower than 50° C. |
| Heat of combustion | 42.5 MJ/kg |
| Thermal stability: | Motor Fuel Composition 12 was a homogeneous liquid stable at atmospheric pressure over a range of temperature from −36° C. (cloud temperature) to 184° C. (initial boiling temperature). |

An analysis of the amount of pollutants in the exhaust emissions from a standard diesel engine of the VW GOLF CL DIESEL automobile, engine family: Dl-W03-92 according to Test Type—Modified European Driving Cycle (NEDC UDC+EUDC) ECE OICA (91/441/EEC) for Motor Fuel Composition 12, showed a reduction of CO (g/km) of 16%, HC+NO$_x$ (g/km) of 7.5% and particles (g/km) of 18.5% in comparison with the results obtained for 100% Mk1 diesel fuel (SS 15 54 35).

An analysis of the amount of pollutants in the exhaust emissions from a standard diesel engine of a truck, engine type: VOLVO D7C 290 EUR02 No: 1162 XX, power kW/rpm=213/2200 according to the Test Type: ECE R49 A30 Regulation, for Motor Fuel Composition 12 in comparison to 100% Mk1 diesel fuel (SS 15 54 35), showed a reduction in the amounts of CO (g/kW) of 12%, HC+NO$_x$ (g/kW) of 5.0%, particles (g/kW) of 17.5%.

The power (PkW) of the engine operated on Motor Fuel Composition 12 did not change and the fuel consumption (1/kW) did not increase in comparison with the results obtained for the same engine operated with 100% Mk1 diesel fuel (SS 15 54 35).

EXAMPLE 13

Motor Fuel Composition 13 demonstrated the possibility of using, for operating a standard diesel engine, a fuel composition of a hydrocarbon liquid and organic compounds containing bound oxygen useful at elevated temperatures, which has a flash point not lower than 100° C.

The content by volume of components in Motor Fuel Composition 13 is: 1-octanol—2%; ethyl oleate—4%; ethyl caprylate—2.5%; di-n-amyl ether 4%; di-octyl ether—15%; acetaldehyde dibutyl acetal 2%; cyclohexyl nitrate—0.5%; and hydrocarbon liquid (gas oil)—70%.

The fuel composition had the following characteristics:

| | |
|---|---|
| Density at 20° C. | 0.826 g/cm$^3$ |
| Temperature limits of evaporation of the liquid by boiling at atmospheric pressure: | |
| up to 100° C. | 0% |
| up to 150° C. | 0% |
| up to 200° C. | 18% |
| up to 400° C. | 98% |
| Flash point | not lower than 100° C. |
| Heat of combustion | 42.5 MJ/kg |
| Thermal stability: | Motor Fuel Composition 13 was a homogeneous liquid stable at atmospheric pressure over a range of temperature from −20° C. (cloud temperature) to 184° C. (initial boiling temperature). |

An analysis of the amount of pollutants in the exhaust emissions from a standard diesel engine of the VW GOLF CL DIESEL automobile, engine family: Dl-W03-92 according to Test Type—Modified European Driving Cycle (NEDC UDC+EUDC) ECE OICA (91/441/EEC) for Motor Fuel Composition 13, showed a reduction in comparison with the results obtained for 100% Mk1 diesel fuel (SS 15 54 35) of: CO (g/km) of 6.9%, HC+NO$_x$ (g/km) of 2.3% and particles (g/km) of 2.5%.

An analysis of the amount of pollutants in the exhaust emissions from a standard diesel engine of a truck, engine type: VOLVO D7C 290 EUR02 No: 1162 XX, power kW/rpm=213/2200 according to the Test Type: ECE R49 A30 Regulation, for Motor Fuel Composition 13 in comparison with 100% Mk1 diesel fuel (SS 15 54 35), showed a reduction in the amounts of CO (g/kW) of 0%, HC+NO$_x$ (g/kW) of 0%, particles (g/kW) of 0%.

The power (PkW) of the engine operated on Motor Fuel Composition 13 did not change and the fuel consumption (1/kW) did not increase in comparison with the results obtained for the same engine operated with 100% Mk1 diesel fuel (SS 15 54 35).

EXAMPLE 14

Motor Fuel Composition 14 demonstrated the possibility of using, for operating a diesel engine, a fuel composition of a hydrocarbon liquid and of organic compounds containing bound oxygen that is effective at reduced operating temperatures.

The content by volume of the components in the fuel composition were: ethanol—10%; acetaldehyde diethyl acetal—2.5%; dibutyl ether—10%; di-isoamyl ether—6.5%; butyl butyrate—3.5%; methyltetrahydrofuran—5%; isoamyl acetate—2%; isoamyl nitrate—0.5%; and hydrocarbon liquid (Mk1 diesel fuel SS 15 54 35)—60%.

The fuel composition had the following characteristics:

| | |
|---|---|
| Density at 20° C. | 0.807 g/cm$^3$ |
| Temperature limits of evaporation of the liquid by boiling at atmospheric pressure: | |
| up to 100° C. | 15% |
| up to 150° C. | 30% |
| up to 200° C. | 41.5% |
| up to 285° C. | 96.5% |
| Heat of combustion | 40.4 MJ/kg |
| Thermal stability: | Motor Fuel 14 was a homogeneous liquid stable at atmospheric pressure over a range of temperature from −40° C. (cloud temperature) to 78° C. (initial boiling temperature). |

An analysis of the amount of pollutants in the exhaust emissions of a standard diesel engine of the VW GOLF CL DIESEL automobile, engine family: Dl-W03-92 when testing Motor Fuel Composition 14 according to the Test Type—Modified European Driving Cycle (NEDC UDC+FUDC) FCF OICA (91/441/EEC), in comparison with the results obtained for 100% Mk1 diesel fuel (SS 15 54 35), showed a reduction in the amounts of: CO (g/kW) of 16.9%, HC+NO$_x$ (g/kw) of 8.8%, and particles (g/kW) of 20.5%.

The use of Motor Fuel Composition 14 for operating a standard diesel truck engine, engine type VOLVO TD61GS No. 0580026, with power and torque settings: kW/Nm/rpm= 140/520/1900, for measurements over the range of 1000–2600 rpm, showed less than a 3.5% decrease in power and torque values in comparison with the values obtained for the same engine operated with 100% Mk1 diesel fuel (SS 15 54 35).

EXAMPLE 15

Motor Fuel Composition 15 demonstrated the possibility of using, for operating a standard diesel engine and a standard jet engine, a fuel composition of a hydrocarbon liquid and of organic compounds containing bound oxygen that is effective at reduced operating temperatures. The hydrocarbon liquid of the Motor Fuel Composition 15 is a mixture of hydrocarbons yielded in processing of gaseous $C_2$ to $C_5$ hydrocarbons.

The content by volume of the components in the fuel composition were: ethanol—8%; methanol—1%; dibutyl ether—6%; di-isoamyl ether—8%; butyl butyrate—3.5%; tetrahydrofurfuryl alcohol—5%; isoamyl acetate—2%; isoamyl nitrate—0.5%; and hydrocarbon liquid (C6–C14 hydrocarbons mixture, including not less than 45% of linear hydrocarbons)—65%.

The fuel composition had the following characteristics:

| | |
|---|---|
| Density at 20° C. | 0.790 g/cm³ |
| Temperature limits of evaporation of the liquid by boiling at atmospheric pressure: | |
| up to 100° C. | 9% |
| up to 150° C. | 17% |
| up to 200° C. | 50% |
| up to 280° C. | 98% |
| Heat of combustion | 42.4 MJ/kg |
| Thermal stability: | Motor Fuel Composition 15 was a homogeneous liquid stable at atmospheric pressure over a range of temperature from –70° C. (cloud temperature) to 64.5° C. (initial boiling temperature). |

An analysis of the amount of pollutants in the exhaust emissions of a standard diesel engine of the VW GOLF CL DIESEL automobile, engine family: Dl-W03-92 when testing Motor Fuel Composition 15 according to the Test Type—Modified European Driving Cycle (NEDC UDC+ FUDC) FCF OICA (91/441/EEC), in comparison with the results obtained for 100% Mk1 diesel fuel (SS 15 54 35), showed a reduction in the amounts of: CO (g/kW) of 26.3%, HC+$NO_x$ (g/kw) of 12.6%, and particles (g/kW) of 31.8%.

The use of Motor Fuel Composition 15 for operating a standard diesel truck engine, engine type VOLVO TD61GS No. 0580026, with power and torque settings: kW/Nm/rpm= 140/520/1900, for measurements over the range of 1000–2600 rpm, showed less than a 4.5% decrease in power and torque values in comparison with the values obtained for the same engine operated with 100% Mk1 diesel fuel (SS 15 54 35).

Similar results for power and exhaust emission changes were obtained when employing the Motor Fuel Composition 15 for operation of a standard aeroplane jet engine.

EXAMPLE 16

Motor Fuel Composition 16 demonstrates the possibility of using, for operating a diesel engine, a fuel composition for a diesel engine that contains a hydrocarbon liquid and organic compounds containing bound oxygen, as well as 1% of water, without adversely affecting its operating characteristics and without compromising the stability of the system.

The content by volume of the components in the Motor Fuel Composition 16 is: water—1%; ethanol—9%; di-ethoxypropane—1%; 1-butanol—4%; methyl butyrate—4%; 2-ethylhexanol—20%; methyltetrahydropyran—5%; dihexyl ether—5%; isopropyl nitrate—1%; and hydrocarbon liquid (Mk1 diesel fuel SS 15 54 35)—50%.

The fuel composition had the following characteristics:

| | |
|---|---|
| Density at 20° C. | 0.822 g/cm³ |
| Temperature limits of evaporation of the liquid by boiling at atmospheric pressure: | |
| up to 100° C. | 10% |
| up to 150° C. | 30% |
| up to 200° C. | 50% |
| up to 285° C. | 97.5% |
| Heat of combustion | 39.4 MJ/kg |
| Thermal stability: | Motor Fuel Composition 16 was a homogeneous liquid stable at atmospheric pressure over a range of temperature from –36° C. (cloud temperature) to 78° C. (initial boiling temperature). |

An analysis of the amount of pollutants in the exhaust emission of a standard diesel engine of the Cardiovascular VW Passat TDI 1.9 model 1997, engine family 2Dl-WDE-95, power kW/rpm=81/4150 according to the Test Type—Modified European Driving Cycle (NEDC UDC+EUDC) ECE OICA (91/441/EEC) for Motor Fuel Composition 16, in comparison with 100% Mk1 diesel fuel (SS 15 54 35), showed a reduction in the amount of: CO (g/km)—22.4%, HC+$NO_x$ (g/km)—0% and particles (g/km)—6.9%.

An analysis of the amount of pollutants in the exhaust emission of the standard diesel truck engine, engine type: VOLVO D7C 290 EUR02 No. 1162 XX, power kW/rpm= 213/2200 according to the Test Type: ECE R49 A30 Regulation, for Motor Fuel composition 16, showed the following results in comparison with 100% Mk1 diesel fuel (SS 15 54 35)—reduction in the amounts of: CO (g/kW)—6%, HC+$NO_x$ (g/kW)—0%, particles (g/kW)—11%.

The power (PkW) of this diesel truck engine operated on Motor Fuel Composition 16 decreased only 3% and fuel consumption (1/kw) increased only 2% in comparison with the results obtained for the same engine working on 100% Mk1 diesel fuel (SS 15 54 35).

EXAMPLE 17

Motor Fuel Composition 17 demonstrates the possibility of using, for operating a standard diesel engine and a standard ship gas-turbine engine, a fuel composition containing a hydrocarbon liquid and organic compounds containing bound oxygen, as well as 1% of water, without adversely affecting its operating characteristics and without compromising the stability of the system. Both the hydrocarbon component and the oxygen-containing components of this composition are obtained from vegetation processing.

The content by volume of the components in the Motor Fuel Composition 17 is: water—1%; ethanol—9%; di-ethoxypropane—1%; 1-butanol—4%; methyl butyrate—4%; 2-ethylhexanol—12%; methyl-epoxytallowate—5%; diisobutyl ketone—3%; methyltetrahydropyran—5%; dibutyl ether—5%; isopropyl nitrate—1%; and hydrocarbon liquid (synthin derived from synthesis-gas obtained from cellolignine originating from vegetation)—50%.

The fuel composition had the following characteristics:

| | |
|---|---|
| Density at 20° C. | 0.822 g/cm³ |
| Temperature limits of evaporation of the liquid by boiling at atmospheric pressure: | |
| up to 100° C. | 10% |
| up to 150° C. | 30% |
| up to 200° C. | 50% |
| up to 400° C. | 99.5% |
| Heat of combustion | 39.4 MJ/kg |
| Thermal stability: | Motor Fuel Composition 17 was a homogeneous liquid stable at atmospheric pressure over a range of temperature from −36° C. (cloud temperature) to 78° C. (initial boiling temperature). |

An analysis of the amount of pollutants in the exhaust emission of a standard diesel engine of the Cardiovascular VW Passat TDI 1.9 model 1997, engine family 2Dl-WDE-95, power kW/rpm=81/4150 according to the Test Type—Modified European Driving Cycle (NEDC UDC+EUDC) ECE OICA (91/441/EEC) for Motor Fuel Composition 17, in comparison with 100% Mk1 diesel fuel (SS 15 54 35), showed a reduction in the amount of: CO (g/km)—18.1%, HC+NO$_x$ (g/km)—1.2% and particles (g/km)—23.4%.

An analysis of the amount of pollutants in the exhaust emission of a standard diesel truck engine, engine type: VOLVO D7C 290 EUR02 No. 1162 XX, power kW/rpm=213/2200 according to the Test Type: ECE R49 A30 Regulation, for Motor Fuel composition 17, showed the following results in comparison with 100% Mk1 diesel fuel (SS 15 54 35)—reduction in the amounts of: CO (g/kW)—12%, HC+NO$_x$ (g/kW)—0%, particles (g/kW)—13.5%.

The power (PkW) of this diesel truck engine operated on Motor Fuel Composition 17 decreased only 3% and fuel consumption (1/kw) increased only 2% in comparison with the results obtained for the same engine working on 100% Mk1 diesel fuel (SS 15 54 35).

Similar results were obtained when employing the Motor Fuel Composition 17 for operation of a standard ship gas-turbine engine.

EXAMPLE 18

Motor Fuel Composition 18 illustrates a fuel composition for standard diesel and gas-turbine engines formed entirely from organic compounds containing bound oxygen, all of which may be produced from renewable raw material of plant origin. No diesel, kerosene, gas oil or other hydrocarbon fraction was present.

The content by volume of the components in the fuel composition is: ethanol—1%; 1-butanol—4%; 2-ethylhexaldehyde—10%; acetaldehyde dibutyl acetal—6%; di-2-ethylhexyl ether—18%; di-octyl ether—20%; di-n-amyl ether—4%; dibutyl ether—7%; ethyl oleate—16%; rape seed oil methyl ester—13.5%; and di-tert-butyl peroxide—0.5%.

The fuel composition had the following characteristics:

| | |
|---|---|
| Density at 20° C. | 0.830 g/cm³ |
| Temperature limits of evaporation of the liquid by boiling at atmospheric pressure: | |
| up to 100° C. | 1% |
| up to 150° C. | 12.5% |
| up to 200° C. | 50% |
| up to 370° C. | 95.5% |
| Heat of combustion | 40.6 MJ/kg |
| Self-ignition temperature | 150° C. |
| Thermal stability: | Motor Fuel Composition 18 was a homogeneous liquid stable at atmospheric pressure over a range of temperature from −20° C. (cloud temperature) to 78° C. (initial boiling temperature). |

An analysis of the amount of pollutants in the exhaust emission of a standard diesel engine of the VW Passat TDI 1.9 model 1997 automobile, engine family 2Dl-WDE-95, power kW/rpm=81/4150 according to the Test Type—Modified European Driving Cycle (NEDC UDC+EUDC) ECE OICA (91/441/EEC) for Motor Fuel Composition 18, in comparison with 100% Mk1 diesel fuel (SS 15 54 35), showed a reduction in the amount of: CO (g/km)—5.5%; HC+NO$_x$ (g/km)—8.5% and particles (g/km)—17.2%.

An analysis of the amount of pollutants in the exhaust emission of a standard diesel truck engine, engine type: VOLVO D7C 290 EUR02 No. 1162 XX, power kW/rpm=213/2200 when executing Test Type: ECE R49 A30 Regulation, for Motor Fuel Composition 18, showed the following results in comparison with 100% Mk 1 diesel fuel (SS 15 54 35)—a reduction in the amounts of CO (g/kW) of 0%; HC+NO$_x$ (g/kW) of 0%, and particles (g/kW) of 0%.

The power (PkW) of this diesel truck engine operated on Motor Fuel Composition 18 did not change nor did fuel consumption 1/kW change in comparison with the same engine operating on 100% Mk1 diesel fuel (SS 15 54 35). Similar results were obtained when employing the Motor Fuel Composition 18 for operation of a standard ship gas-turbine engine. These results illustrate how the instant invention provides a unique and effective motor fuel composition for diesel engines that does not require a typical heavier hydrocarbon fraction, such as diesel fuel.

EXAMPLE 19

Motor Fuel Composition 19 illustrates a fuel composition formed entirely from oxygen containing compounds, and characterized by good performance properties, including a flash point of 32° C.

The content by volume of the components in the fuel composition is: 1-butanol—5%; 2-ethylhexaldehyde—8%; acetaldehyde dibutyl acetal—6%; di-2-ethylhexyl ether—18%; di-octyl ether—20%; di-n-amyl ether—4%; dibutyl ether—7%; ethyl oleate—16%; rape seed oil methyl ester—12.0%; and ethylamyl ketone—2%, 1,2-epoxy-4-epoxycyclohexane—2%.

The fuel composition had the following characteristics:

| | |
|---|---|
| Density at 20° C. | 0.831 g/cm³ |
| Temperature limits of evaporation of the liquid by boiling at atmospheric pressure: | |
| up to 100° C. | 0% |
| up to 150° C. | 12.0% |
| up to 200° C. | 48% |
| up to 285° C. | 95.5% |
| Heat of combustion | 40.7 MJ/kg |
| Flash point | 32° C. |
| Self-ignition temperature | 150° C. |
| Thermal stability: | Motor Fuel Composition 19 was a homogeneous liquid stable at atmospheric pressure over a range of temperature from −30° C. (cloud temperature) to 117° C. (initial boiling temperature). |

An analysis of the amount of pollutants in the exhaust emission of a standard diesel engine of the VW Passat TDI 1.9 model 1997 automobile, engine family 2Dl-WDE-95, power kW/rpm=81/4150 according to the Test Type—Modified European Driving Cycle (NEDC UDC+EUDC) ECE OICA (91/441/EEC) for Motor Fuel Composition 19, in comparison with 100% Mk1 diesel fuel (SS 15 54 35), showed a reduction in the amount of: CO (g/km)—7.5%; HC+NO$_x$ (g/km)—7.5% and particles (g/km)—18.2%.

An analysis of the amount of pollutants in the exhaust emission of a standard diesel truck engine, engine type: VOLVO D7C 290 EUR02 No. 1162 XX, power kW/rpm=213/2200 when executing Test Type: ECE R49 A30 Regulation, for Motor Fuel Composition 19, showed the following results in comparison with 100% Mk 1 diesel fuel (SS 15 54 35)—a reduction in the amounts of CO (g/kW) of 8%; HC+NO$_x$ (g/kW) of 6%, and particles (g/kW) of 15%

Similar results were obtained when employing the Motor Fuel Composition 19 for operation of a standard ship gas-turbine engine.

EXAMPLE 20

Motor Fuel Composition 20 demonstrates the effects of operating a standard diesel, turbojet and gas-turbine engines with a fuel composition entirely formed of organic compounds containing bound oxygen, stable over a wide range of ambient temperature and tolerant to presence of water. The fuel composition is characterised by good performance properties and produces exhaust emissions with a very low content of pollutants.

The content by volume of the components in Motor Fuel Composition 20 is as follows: isoamyl alcohol—2%; diisoamyl ether—5%; cyclopentanone—2.5%; cyclohexyl nitrate—0.5%; 1.2-epoxy-4-epoxy-cyclohexane—10%; isobornyl methacrylate—20% and 2,6,8-trimethyl-4-nonanole—60%.

The fuel composition had the following characteristics:

| | |
|---|---|
| Density at 20° C. | 0.929 g/cm³ |
| Temperature limits of evaporation by boiling of The liquid at atmospheric pressure: | |
| up to 100° C. | 0% |
| up to 150° C. | 4.5% |
| up to 200° C. | 10% |
| up to 280° C. | 99.9% |
| Flash point, not lower than | 42° C. |
| Self-ignition point | 185° |
| Heat of combustion | 39.6 MJ/kg |
| Thermal stability: | Motor Fuel Composition 20 was a homogeneous liquid stable at atmospheric pressure over a range of temperature from −55° C. (cloud temperature) to 131° C. (initial boiling temperature). |

An analysis of the amount of pollutants in the exhaust emission from a standard diesel engine of the VW Passat TDI 1.9 automobile, model 1997, Engine Family 2Dl-WDE-95, power kW/rpm=81/4150 according to the Test Type—Modified European Driving Cycle (NEDC UDC+EUDC) ECE OICA (91/441/EEC) for Motor Fuel Composition 20, in comparison with 100% Mk1 diesel fuel (SS 15 54 35), showed a reduction in the amounts of CO (g/km) of 62.3%; HC+NO$_x$ (g/km) of 23.5% and particles (g/km) of 54.2%.

An analysis of the amount of the pollutants in the exhaust emissions from a standard diesel truck engine, Engine Type: VOLVO D7C 290 EUR02 No. 1162 XX, power kW/rpm=213/2200 according to the Test Type: ECE R49 A30 Regulation for fuel composition 20, in comparison with 100% Mk1 diesel fuel (SS 15 54 35), showed a reduction in the amounts of: CO (g/kW) of 38.2%; HC+NO$_x$ (g/kW) of 16.8%, and particles (g/kW) of 49.3%.

The power (PkW) of the engine when operating on Motor Fuel Composition 20 increased by 2%, and the fuel consumption (1/kW) decreased by 3%.

Similar results of the reduction of pollutants in the exhaust emissions were obtained when employing the Motor Fuel Composition 20 for operation of a standard ship gas-turbine engine and standard airplane turbojet engine.

Motor Fuel Composition 20 is immiscible with water and does not adopt almost any amounts of water. When Motor Fuel Composition 20 is intensively mixed with water by mechanical means, an emulsion is obtained. After the mixing is stopped, a separate layer of water is obtained at the bottom of the tank, and the unaffected motor fuel forms an upper layer in the tank.

EXAMPLE 21

Motor Fuel Composition 21 demonstrated the possibility of increasing the stability of a fuel comprising ordinary kerosene containing some amount of water at lower temperatures.

The content by volume of components in Motor Fuel Composition 21 is: tetrahydrofurfuryl alcohol—3%; tertbutylperoxyacetate—2%, hydrocarbon liquid (kerosene with a cloud point of −46° C.)—95%.

The fuel composition had the following characteristics:

| | |
|---|---|
| Density at 20° C. | 0.791 g/cm³ |
| Temperature limits of evaporation of the liquid by boiling at atmospheric pressure: | |
| up to 100° C. | 0% |
| up to 150° C. | 0% |
| up to 200° C. | 18% |

-continued

| | |
|---|---|
| up to 220° C. | 99.99% |
| Heat of combustion | 43.3 MJ/kg |
| Thermal stability: | Motor Fuel Composition 21 was a homogeneous liquid stable at atmospheric pressure over a range of temperature from −60° C. (cloud temperature) to 178° C. (initial boiling temperature). |

An analysis of the amount of pollutants in the exhaust emission from a standard diesel engine of the VW Passat TDI 1.9 automobile, model 1997, Engine Family 2Dl-WDE-95, power kW/rpm=81/4150 according to the Test Type—Modified European Driving Cycle (NEDC UDC+EUDC) ECE OICA (91/441/EEC) for Motor Fuel Composition 21, in comparison with 100% Mk1 diesel fuel (SS 15 54 35), showed a reduction in the amounts of CO (g/km) of 25%; HC+NO$_x$ (g/km) of 3.5% and particles (g/km) of 30%.

Similar results were obtained when employing the Motor Fuel Composition 21 for operation of a standard airplane turbojet engine.

EXAMPLE 22

Motor Fuel Composition 22 demonstrated a possibility, of inter alia, eliminating a lubrication additive from the composition of a hydrocarbon component of the fuel.

The content by volume of components in Motor Fuel Composition 22 is: methylepoxytallowate—10%; tetrahydrofurfuryl alcohol—0.5%, hydrocarbon liquid (Mk1-type fuel without lubricating additive)—89.5%.

The fuel composition had the following characteristics:

| | |
|---|---|
| Density at 20° C. | 0.821 g/cm$^3$ |
| Temperature limits of evaporation of the liquid by boiling at atmospheric pressure: | |
| up to 100° C. | 0% |
| up to 150° C. | 0% |
| up to 200° C. | 25% |
| up to 350° C. | 98% |
| Heat of combustion | 42.6 MJ/kg |
| Thermal stability: | Motor Fuel Composition 22 was a homogeneous liquid stable at atmospheric pressure over a range of temperature from −30° C. (cloud temperature) to 177° C. (initial boiling temperature). |

An analysis of the amount of pollutants in the exhaust emission from the standard diesel engine of the VW Passat TDI 1.9 automobile, model 1997, Engine Family 2Dl-WDE-95, power kW/rpm=81/4150 according to the Test Type—Modified European Driving Cycle (NEDC UDC+EUDC) ECE OICA (91/441/EEC) for Motor Fuel Composition 22, in comparison with 100% Mk1 diesel fuel (SS 15 54 35), showed a reduction in the amounts of CO (g/km) of 3.6%; HC+NO$_x$ (g/km) of 1.2% and particles (g/km) of 10.5%.

Similar results were obtained when employing the Motor Fuel Composition 22 for operation of a standard ship gas-turbine engine.

EXAMPLE 23

Motor Fuel Composition 23 demonstrated the possibility of eliminating an anti-deposit additive from the base diesel fuel.

The content by volume of components in Motor Fuel Composition 23 is: tetrahydrofurfurylacetate—10%; acetoacetaldehyde-1,1-dimethylacetal—0.5%, hydrocarbon component (EN590:1993-type fuel without anti-deposit additive)—89.5%.

The fuel composition had the following characteristics:

| | |
|---|---|
| Density at 20° C. | 0.837 g/cm$^3$ |
| Temperature limits of evaporation of the liquid by boiling at atmospheric pressure: | |
| up to 100° C. | 0% |
| up to 150° C. | 0% |
| up to 200° C. | 20% |
| up to 370° C. | 98.5% |
| Heat of combustion | 41.26 MJ/kg |
| Thermal stability: | Motor Fuel Composition 23 was a homogeneous liquid stable at atmospheric pressure over a range of temperature from −30° C. (cloud of temperature) to 190° C. (initial boiling temperature). |

An analysis of the amount of pollutants in the exhaust emission from the standard diesel engine of the VW Passat TDI 1.9 automobile, model 1997, Engine Family 2Dl-WDE-95, power kW/rpm=81/4150 according to the Test Type—Modified European Driving Cycle (NEDC UDC+EUDC) ECE OICA (91/441/EEC) for Motor Fuel Composition 23, in comparison with 100% diesel fuel (EN590:1993), showed a reduction in the amounts of CO (g/km) of 9.5%; HC+NO$_x$ (g/km) of 2% and particles (g/km) of 17.3%.

Similar results were obtained when employing the Motor Fuel Composition 23 for operation of a standard ship gas-turbine engine.

EXAMPLE 24

Motor Fuel Composition 24 demonstrated a possibility of eliminating completely the need for a hydrocarbon component in a motor fuel composition by using two oxygen-containing compounds and to obtain the required performance parameters without use of any hydrocarbon component.

The content by volume of components in Motor Fuel Composition 24 is: butylepoxystearate—50%; ethyleneglycolmono-2-ethylhexyl ether—50%.

The fuel composition had the following characteristics:

| | |
|---|---|
| Density at 20° C. | 0.898 g/cm$^3$ |
| Temperature limits of evaporation of the liquid by boiling at atmospheric pressure: | |
| up to 100° C. | 0% |
| up to 150° C. | 0% |
| up to 220° C. | 20% |

| | |
|---|---|
| up to 250° C. | 99.95% |
| Flash point | 115° C. |
| Thermal stability: | Motor Fuel Composition 24 was a homogeneous liquid stable at atmospheric pressure over a range of temperature from −30° C. (cloud of temperature) to 200° C. (initial boiling temperature). |

An analysis of the amount of pollutants in the exhaust emission from the standard diesel engine of the VW Passat TDI 1.9 automobile, model 1997, Engine Family 2Dl-WDE-95, power kW/rpm=81/4150 according to the Test Type—Modified European Driving Cycle (NEDC UDC+EUDC) ECE OICA (91/441/EEC) for Motor Fuel Composition 24, in comparison with 100% diesel fuel (EN590:1993), showed a reduction in the amounts of CO (g/km) of 32.4%; HC+NO$_x$ (g/km) of 21.8% and particles (g/km) of 52.6%.

EXAMPLE 25

Motor fuel composition 25 demonstrated the possibility of using, for the operation of a diesel engine, a fuel composition consisting of a hydrocarbon liquid and organic compounds containing bound oxygen that is expedient when used at reduced ambient temperatures.

The contents by volume of the components in the fuel in Motor Fuel Composition 25 are ethanol 10%, acetaldehyde diethyl acetal 2.5%, dibutyl ether 5%, di-isoamyl ether 6.5%, butyl butyrate 3.5%, methyltetrahydrofuran 5%, isoamyl acetate 2%, amyl nitrate 0.5%, hydrocarbon liquid (Mk1 diesel fuel SS 15 54 35) 65%. The fuel composition had the following characteristics:

| | |
|---|---|
| Density at 20° C. | 0.811 g/cm$^3$ |
| Temperature limits of evaporation of the liquid by boiling at atmospheric pressure: | |
| up to 100° C. | 15% |
| up to 150° C. | 25% |
| up to 200° C. | 41.5% |
| up to 285° C. | 96.5% |
| Heat of combustion | 40.4 MJ/kg |
| Thermal stability | Motor Fuel 25 was a homogeneous liquid stable at atmospheric pressure over a range of temperature from −40° C. (cloud temperature) to 78° C. (initial boiling temperature). |

An analysis of the amount of pollutants in the exhaust emissions of a standard diesel engine of the VW GOLF CL DIESEL automobile, engine family: Dl-W03-92 when testing Motor Fuel Composition 25 according to the Test Type—Modified European Driving Cycle (NEDC UDC+ FUDC) FCF OICA (91/441/EEC), in comparison with the results obtained for 100% Mk1 diesel fuel (SS 15 54 35), showed a reduction in the amounts of: CO (g/kW) of 16.9%, HC+NO$_x$ (g/kw) of 8.8%, and particles (g/kw) of 20.5%.

The use of Motor Fuel Composition 25 for operating a standard diesel truck engine, engine type VOLVO TD61GS No. 0580026, with power and torque settings: kW/Nm/rpm= 140/520/1900, for measurements over the range of 1000–2600 rpm, showed less than a 3.5% decrease in power and torque values in comparison with the values obtained for the same engine operated with 100% Mk1 diesel fuel (SS 15 54 35).

Each of the Motor Fuel Compositions 1–25 was prepared by adding the required amount of components in the same tank at the same temperature in a pre-determined order, starting with the component having (at that temperature) the lowest density and ending with the component having the highest density, and holding the resulting mixture for at least one hour prior to use.

Example 1 defines a minimum concentration of organic compounds containing bound oxygen in the mixture with a hydrocarbon component, to achieve the advantages of the present invention.

Examples 2 to 9, 13, 15, and 17 demonstrate the possibility of achieving the positive effect of this invention irrespective of the composition of the hydrocarbon component, i.e., that the invention enables employing various hydrocarbon liquids sold presently on the market.

Examples 4, 5, 8, and 11 demonstrate the possibility of producing the motor fuels for diesel engines using a petroleum kerosene fraction. These fuels can also be used for jet engines. Moreover, examples 5, 8 and 15 demonstrate that the fuel of the invention comprising a particular hydrocarbon component remains stable at temperatures as low as −70° C. This property is not demonstrated by any of the fuel formulations revealed by the prior art.

Examples 4, 10, and 11 demonstrate that the present invention enables mixing over an extremely wide range of concentrations of organic compounds containing bound oxygen and a hydrocarbon liquid, wherein no engine modification is required.

Examples 7 and 11 demonstrate the possibility of using hydrocarbons yielded in mineral coal processing as a hydrocarbon component of the motor fuel.

Examples 8 and 9 demonstrate the possibility of using methanol and ethanol as a raw material for oxygen-containing compounds required for producing the novel motor fuel of this invention. Both methanol and ethanol are largely produced in many countries of the world. Thus, the novel fuel of this invention has a good potential for raw materials. Majority of the organic compounds containing bound oxygen needed for manufacture of the fuel of this invention are presently produced on an industrial scale. Therefore, production of the motor fuel of this invention is feasible and can be initiated within a short period of time.

Examples 10 and 11 demonstrate the possibility of using, for producing of a motor fuel, an organic compound containing bound oxygen that is not thoroughly purified and may contain by-products. This simplifies the production technology and makes the constituents compounds cheaper and more accessible.

Examples 12 and 13 demonstrate the possibility of formulating the novel motor fuel stable over a wide temperature range, from −36° C. to +184° C. It should be stressed, that when the temperature is changed to a value outside the above-mentioned range, the fuel of this invention will again form a single, stable and homogeneous phase after it has been allowed to return to temperatures within the range of −36° C. to +184° C., between the cloud point and starting boiling point. The examples also demonstrate that the fuels have a high flash point, making them safer and simpler in transportation, handling and distribution.

Examples 5, 8, 14, 15 and 25 demonstrate the possibility of formulating the novel motor fuel operating at ambient temperatures below 0° C. Moreover, the hydrocarbon fraction obtained in processing of gaseous $C_2$–$C_5$ hydrocarbons can be used for producing the motor fuel of this invention.

Examples 16 and 17 demonstrate the possibility of producing the novel motor fuel that is tolerant regarding the presence of water. The volume content of water of up to 1% does not affect the stability of the fuel even at temperatures as low as −36° C. This is an extremely important feature of this invention. The motor fuel of this invention does not require thoroughly dehydrated oxygen-containing compounds for its production, making manufacturing cheaper and simpler. Moreover, example 17 demonstrates the possibility of employing hydrocarbons yielded in processing of vegetation as a fuel component. The latter feature enables formulation of the motor fuel formed entirely from renewable components.

Examples 18, 19 and 20 demonstrate the possibility of producing the novel motor fuel for standard engines comprising oxygen-containing compounds only, without using any hydrocarbons. Such a fuel was never before revealed. Even specially designed ethanol fuel engines require a certain amount of hydrocarbons in the fuel to improve ignition.

Examples 21–24 demonstrate, inter alia, that the requested combination of four functional groups can be achieved by employing two compounds. Example 24 demonstrates the possibility of producing the novel motor fuel for standard engines comprising only two oxygen-containing compounds without using any hydrocarbons.

Other variations of the invention are possible, as will be clear to those of ordinary skill in the art, such as, for example, using only three compounds. This invention is not limited to the examples set forth herein.

What is claimed is:

1. A stable motor fuel composition for a diesel, gas-turbine or turbojet engine having reduced emission of pollutants, said motor fuel composition comprising:
   (a) an oxygen-containing component comprising at least two different oxygen-containing organic compounds, said oxygen-containing organic compounds comprising in total at least four different oxygen-containing functional groups comprising alcohol, ether, aldehyde, a $C_4$ to $C_{13}$ keto group, ester, nitrate inorganic ester, acetal, epoxide or peroxide, wherein each of said oxygen-containing organic compounds contains at least one of said oxygen-containing groups; and, optionally,
   (b) a hydrocarbon component,
   wherein the motor fuel composition is homogeneous and has the properties:
   (i) density at 20° C. of not less than 0.775 g/cm³;
   (ii) cloud temperature is not higher than 0° C. at atmospheric pressure;
   (iii) stable at atmospheric pressure from a cloud temperature of −50° C. to an initial boiling point of 180° C.; and
   (iv) amounts of liquid evaporated by boiling at atmospheric pressure include:
      not more than 25% of the total volume of the motor fuel composition distills at temperatures no higher than 100° C.;
      not more than 35% of the total volume of the motor fuel composition distills at temperatures no higher than 150° C.;
      not more than 50% of the total volume of motor fuel composition distills at temperatures no higher than 200° C.;
      not less than 98% of the total volume of the motor fuel composition distills at temperatures no higher than 400° C.

2. The motor fuel composition of claim 1, wherein the oxygen-containing component comprises at least four of said oxygen-containing organic compounds.

3. The motor fuel composition of claim 2, wherein each of said oxygen-containing organic compounds contains different said oxygen-containing functional groups.

4. The motor fuel composition of claim 2, wherein each of said oxygen-containing organic compounds contains two of said oxygen-containing functional groups.

5. The motor fuel composition of claim 2, wherein each of said oxygen-containing organic compounds contains one of said oxygen-containing functional groups.

6. The motor fuel composition of claim 1, wherein at least two of said oxygen-containing organic compounds contain at least one of the same oxygen-containing functional groups.

7. The motor fuel composition of claim 1, wherein the oxygen-containing organic compounds are linear or have one side chain.

8. The motor fuel composition of claim 1, wherein the oxygen-containing organic component is present in an amount from about 5% to 100%, based on a total volume of the motor fuel composition, and the hydrocarbon component is present in an amount from 0 to about 95%, based on the total volume of the motor fuel composition.

9. The motor fuel composition of claim 1, wherein the oxygen-containing component comprises (i) an alcohol, (ii) an ether, (iii) an organic ester and (iv) at least one of an aldehyde, a ketone, an inorganic ester, an acetal, an epoxide and a peroxide.

10. The motor fuel composition of claim 9, wherein the oxygen-containing component comprises (i) an alcohol, (ii) an ether, (iii) an organic ester, (iv) an aldehyde, (v) a ketone, (vi) an inorganic ester, (vii) an acetal, (viii) an epoxide and (ix) a peroxide.

11. The motor fuel composition of claim 1, further having at least one of the properties:
   (v) heat of combustion on oxidation by oxygen of not less than 39 MJ/kg;
   (vi) self-ignition temperature from 150° C. to 300° C.; and
   (vii) ability to accommodate at least 1% water by volume.

12. The motor fuel composition of claim 1, wherein not less than 98% of the total volume of the motor fuel composition distills at temperatures no higher than 370° C.

13. The motor fuel composition of claim 1, wherein not less than 98% of the total volume of the motor fuel composition distills at temperatures no higher than 280° C.

14. The motor fuel composition of claim 1, wherein the oxygen-containing component comprises at least one of methanol or ethanol.

15. The motor fuel composition of claim 14, further comprising by-products from production of said methanol or ethanol.

16. The motor fuel composition of claim 1, wherein the oxygen-containing component contains contaminants co-produced or present during production of said oxygen-containing component.

17. The motor fuel composition of claim 1, which is stable at atmospheric pressure over a temperature range from the cloud temperature of −35° C. to the initial boiling temperature of 180° C.

18. The motor fuel composition of claim 1, which is stable over a range of temperatures from the cloud point of −50° C. to the initial boiling point of 50° C.

19. The motor fuel composition of claim 1, further comprising water in an amount up to about 1% by volume based on the total volume of the motor fuel composition.

20. The motor fuel composition of claim 1, wherein the oxygen-containing component is formed from a renewable plant resource.

21. The motor fuel composition of claim 1, wherein the hydrocarbon component is a diesel fraction, or a mixture of a diesel fraction and a hydrocarbon fraction lighter than the diesel fraction.

22. The motor fuel composition of claim 1, wherein the hydrocarbon component is a gas oil fraction or a mixture of the gas oil fraction and a hydrocarbon fraction lighter than the gas oil fraction.

23. The motor fuel composition of claim 1, wherein the hydrocarbon component is obtained from renewable resources.

24. The motor fuel composition of claim 23, wherein the renewable resources comprise turpentine and rosin.

25. The motor fuel composition of claim 1, wherein the hydrocarbon component is obtained from a synthesis-gas, a $C_1$–$C_4$ gas-containing fraction or a pyrolysis of carbonaceous materials.

26. The motor fuel composition of claim 25, wherein the synthesis-gas is obtained from biomass.

27. The motor fuel composition of claim 25, wherein the pyrolysis of carbonaceous materials comprise biomass or a mixture thereof.

28. The motor fuel composition of claim 1, which has lubricating properties.

29. The motor fuel composition of claim 1, which has a flash point of at least 50° C.

30. A method of preparing the motor fuel composition of claim 1, comprising successively introducing into a fuel reservoir at a constant temperature at least said oxygen-containing component comprising at least two oxygen-containing compounds, beginning with a compound having a lowest density at said temperature and terminating with a compound having a highest density at said temperature.

31. A method of reducing deposits in a combustion chamber of a diesel, gas-turbine or turbojet engine comprising introducing into said combustion chamber a motor fuel composition comprising an oxygen-containing component comprising in total at least two different oxygen-containing organic compounds, said oxygen-containing organic compounds comprising at least four different oxygen-containing functional groups comprising alcohol, ether, aldehyde, a $C_4$ to $C_{13}$ keto group, ester, nitrate inorganic ester, acetal, epoxide or peroxide, wherein each of said oxygen-containing organic compounds contains at least one of said oxygen-containing groups, wherein the motor fuel composition is homogeneous and has the properties:
(i) density at 20° C. of not less than 0.775 g/cm$^3$;
(ii) cloud temperature is not higher than 0° C. at atmospheric pressure;
(iii) stable at atmospheric pressure from a cloud temperature of −50° C. to an initial boiling point of 180° C.; and
(iv) amounts of liquid evaporated by boiling at atmospheric pressure include:
not more than 25% of the total volume of the motor fuel composition distills at temperatures no higher than 100° C.;
not more than 35% of the total volume of the motor fuel composition distills at temperatures no higher than 150° C.;
not more than 50% of the total volume of motor fuel composition distills at temperatures no higher than 200° C.;
not less than 98% of the total volume of the motor fuel composition distills at temperatures no higher than 400° C.

* * * * *

UNITED STATES PATENT AND TRADEMARK OFFICE
CERTIFICATE OF CORRECTION

| | |
|---|---|
| PATENT NO. | : 7,014,668 B2 |
| APPLICATION NO. | : 09/848293 |
| DATED | : March 21, 2006 |
| INVENTOR(S) | : Angelica Golubkov et al. |

It is certified that error appears in the above-identified patent and that said Letters Patent is hereby corrected as shown below:

COLUMN 1

Line 51, "currently" should read --currently permit--.

COLUMN 2

Line 41, "Backer" should read --Baker--.

COLUMN 4

Line 18, "reducing" should read --reduce--;
Line 42, "inventor" should read --invention--;
Line 58, "pressure;" should read --pressure:--; and
Line 67, "200° C.;" should read --200° C.; and--.

COLUMN 5

Line 7, "300° C." should read --300° C.; and--.

COLUMN 6

Line 13, "from" (first occurrence) should be deleted.

COLUMN 7

Line 2, "propanal" should read --propanol--.

UNITED STATES PATENT AND TRADEMARK OFFICE
CERTIFICATE OF CORRECTION

PATENT NO. : 7,014,668 B2
APPLICATION NO. : 09/848293
DATED : March 21, 2006
INVENTOR(S) : Angelica Golubkov et al.

It is certified that error appears in the above-identified patent and that said Letters Patent is hereby corrected as shown below:

COLUMN 15

Line 66, "methane" should read --menthane--.

COLUMN 24

Line 30, "of:" should read --of--.

COLUMN 25

Line 54, "nonanole" should read --nonanol--.

COLUMN 30

Line 43, "Majority" should read --The majority--.

COLUMN 31

Line 67, "200° C.;" should read --200°.; and--.

COLUMN 34

Line 32, "200° C.;" should read --200° C.; and--.

Signed and Sealed this

Twenty-sixth Day of September, 2006

JON W. DUDAS
*Director of the United States Patent and Trademark Office*